United States Patent [19]

Tanaka et al.

[11] Patent Number: 4,628,389
[45] Date of Patent: Dec. 9, 1986

[54] LOCK MEMBER FOR THE LID OF A MAGNETIC TAPE CASSETTE

[75] Inventors: Kimio Tanaka, Saku; Haruo Shiba, Komoro; Yoshiya Sakata, Saku, all of Japan

[73] Assignee: TDK Corporation, Tokyo, Japan

[21] Appl. No.: 647,337

[22] Filed: Sep. 5, 1984

[30] Foreign Application Priority Data

Sep. 13, 1983 [JP] Japan .................................. 58-140910
Sep. 13, 1983 [JP] Japan .................................. 58-140911

[51] Int. Cl.⁴ ......................... G11B 23/04; G03B 1/04
[52] U.S. Cl. .................................... 360/132; 242/198; 220/334
[58] Field of Search .................... 360/85, 93, 132, 137; 242/198, 199; 206/387; 220/324, 326, 334, 337

[56] References Cited

U.S. PATENT DOCUMENTS

| | | | |
|---|---|---|---|
| 4,485,988 | 12/1984 | Kikuya et al. | 242/198 |
| 4,485,989 | 12/1984 | Ogiro et al. | 242/198 |
| 4,504,028 | 3/1985 | Goto | 242/198 |
| 4,524,927 | 6/1985 | Sieben | 242/198 |
| 4,533,093 | 8/1985 | Gelardi et al. | 206/387 X |

FOREIGN PATENT DOCUMENTS

| | | | |
|---|---|---|---|
| 0097964 | 1/1984 | European Pat. Off. | 360/85 |
| 58-60475 | 4/1983 | Japan | 360/132 |
| 2102386 | 2/1983 | United Kingdom | 360/132 |
| 2134485 | 8/1984 | United Kingdom | 360/132 |

*Primary Examiner*—Stuart N. Hecker
*Assistant Examiner*—Benjamin E. Urcia
*Attorney, Agent, or Firm*—Seidel, Gonda, Goldhammer & Abbot

[57] ABSTRACT

In a magnetic tape cassette comprising a cassette housing, a lid pivotally connected to the front of the housing to open and close its front opening, and a lock member fitted in one front side portion of the housing and engageable with and disengageable from the inner surface of the lid, a lock-member-biasing spring is accommodated within the thickness of the lock member, with a free end engaged with the housing. The lock member has means with which to press the both end portions of the spring in place. It has also a bulge formed on its side opposite to the recessed side and which is larger in diameter than a pivot by which the lock member is supported by the housing. The bulge is accommodated within a wall opening of the cassette housing.

3 Claims, 7 Drawing Figures

LOCK MEMBER FOR THE LID OF A MAGNETIC TAPE CASSETTE

BACKGROUND OF THE INVENTION

1. Field of the Invention

This invention relates to a magnetic tape cassette and more specifically to a video tape cassette.

2. Description of the Prior Art

Magnetic tape cassettes, especially video tape cassettes, are lidded at the front opening where the tape inside is to be exposed, so as to protect the tape during storage and transportation from dirt and dust deposition which can lead to dropouts or general deterioration of the tape. Meanwhile, the modern trend in the art is toward miniaturization of tape cassettes, and attempts are being made to employ video cassettes using 8-mm-wide magnetic tapes and as small as or even smaller than the compact cassettes for audio recording, or so-called 8 mm video tape cartridges for use on small video tape recorders. Such smaller tape cassettes naturally involve difficulties in manufacture and assembly and require effective utilization of the reduced space within the cassette housing. On these grounds mere miniaturization of the existing video cassettes, whether of the VHS or Beta system, would not give satisfactory products and total redesigning would become necessary.

Generally, a lidded magnetic tape cassette comprises, as shown in FIGS. 1 and 2, an upper housing section 1 and a lower housing section 2 constituting a housing, and a lid 3 provided at the front of the housing, with pivots 5 on the inner surfaces of the both sides 4, 4' of the lid fitted in corresponding bearing holes of the housing section 1 or 2. The lid 3 is normally locked but, as the cassette is loaded into a tape recorder, it is automatically unlocked and pivotally swung open. As illustrated in FIG. 2, the conventional locking mechanism comprises a lock member 7 pivotally connected, by a pin 6, to a pivot hole formed in the mating peripheries on one side of the upper and lower housing section 1, 2, and a leaf spring 9 gripped between the two housing sections to depress one end 8 of the lock member. A hook 10 formed on the other end of the lock member 7 is adapted to engage with an inward projection 11 on a side 4 of the lid. Unlocking is accomplished by forcing a protuberance 12 of the lock member in the direction of the arrow A, against the urging of the leaf spring 9, and thereby turning the lock member 7 counterclockwise.

In the existing locking mechanism of the construction described, the lock member 7 and the leaf spring 9 are held by the upper and lower housing sections 1, 2. Therefore, they must be set together in the upper and lower housing sections, rendering the assembly a rather difficult operation with frequent failure and necessity of reassembling.

SUMMARY OF THE INVENTION

The present invention, primarily directed to improvements in the locking mechanism for the lid of the magnetic tape cassette among the attempts being made in the art for reduction in size of the cassette, has for an object to provide a locking mechanism easy to assemble and compact in structure.

Another object of the invention is to provide a magnetic tape cassette including a lock member which is operable with ease and smaller in size than heretofore. This object is realized in accordance with the invention by preloading a spring in the lock member in such a manner that, once this preassembly is incorporated in place between the upper and lower housing sections, the lock member is subjected in itself to the biasing force of the spring.

A problem associated with the preloading of a spring in the lock member is the necessity of forming a recess in the member large enough to accommodate the spring and that this thin-walled portion would lead to defective molding or deformation due to inadequate strength of the resulting member. This calls for some solution to the problem.

It is a further object of the present invention to solve the problem just mentioned above. The side of the lock member opposite to its recessed side is bulged for added wall thickness. Moreover, to accommodate this bulge the housing is formed with an opening of a corresponding size. Thus, the requirements for the ease of assembly and for miniaturization first above mentioned are both satisfied without in any way increasing the overall dimensions of the cassette housing.

DESCRIPTION OF THE PREFERRED EMBODIMENT

Figure 1:
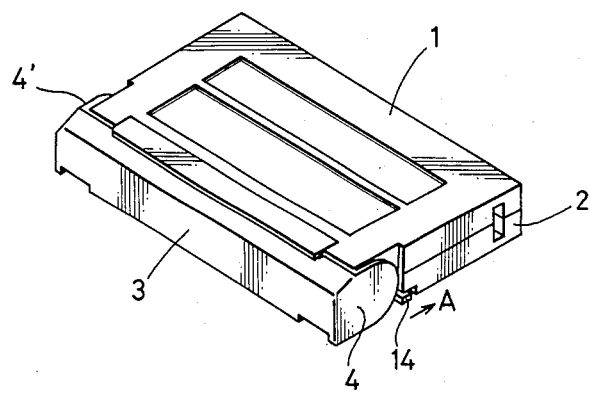
FIG. 1 is a perspective view of a conventional magnetic tape cassette.
Figure 2:
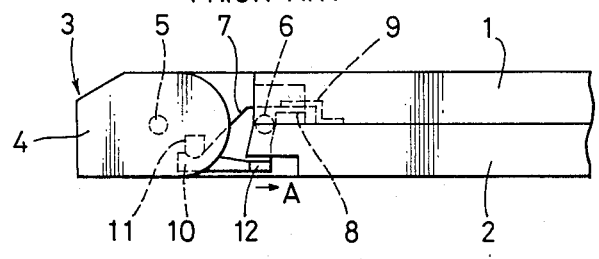
FIG. 2 is a side view of the cassette, illustrating the locking mechanism.

An embodiment of the invention will now be described with reference to FIGS. 3 through 7. The parts like those shown in FIGS. 1 and 2 are designated by like reference numerals and their description is not reiterated here.

The lock member 19 according to this invention is a molded article based on a plate having a pivot 26 to fit in a bearing hole formed in the mating peripheries of the upper and lower housing sections as in a conventional cassette, an end catch 20 adapted to engage with a lug 11 on the inner surface of one side of the lid 3, and a side lug 22 to be actuated from the outside (by actuating means on the part of the tape recorder). The lock member 19 has a recess 27 formed around the pivot 26, and its right hand position (as viewed in FIGS. 3 to 6) forms an overhang 28. The far side of the recess 27 ends with a blind hole 29. A spring 30, having a coiled center fitted over the pivot 26, is engaged at one end with the blind hole 29. This spring is biased clockwise, and its other end is elastically contacted with the overhang 28, with the free end extended a prescribed distance beyond the overhang to abut against a vertical planar surface 33 formed in the lower housing section 2. The free end is bent as downwardly as possible.

Figure 6:
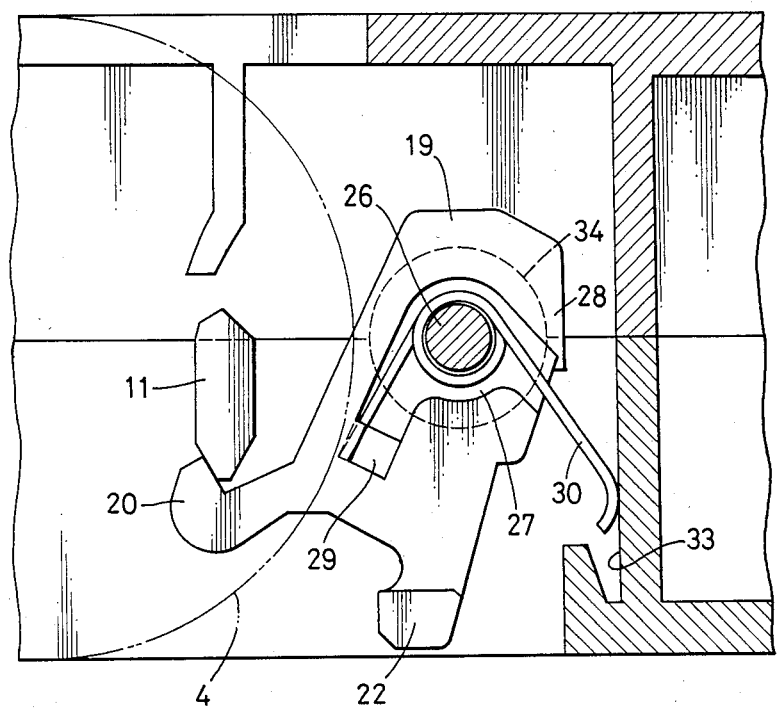
FIG. 6 is an enlarged side view, partly in section, taken along the line A—A of FIG. 7, showing the essential part.
Figure 7:
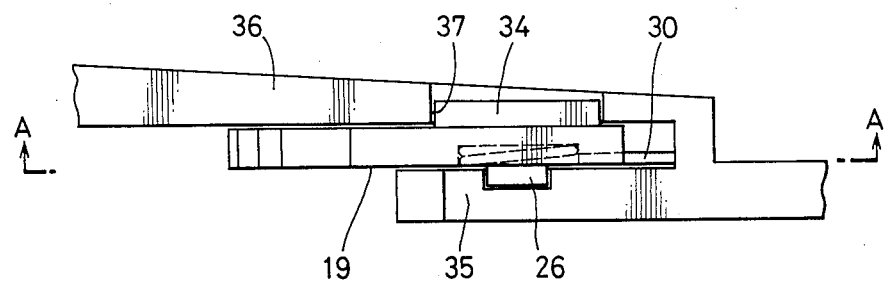
FIG. 7 is a plan view of the essential part, with the upper housing section taken away.

Referring now to FIGS. 6 and 7 which show enlarged views of the locking mechanism according to the invention, the lock member 19 is held between two upright walls 35, 36 or the upper and lower housing sections 1, 2, respectively, and its pivot 26 is supported by a bearing hole formed in the wall 35. The lock member has, on its side opposite to the side where the pivot 26 is formed, a disk-shaped bulge 34 of a diameter larger than that of the pivot. The bulge is loosely fitted in a corresponding opening 37 in the wall 36. This bulge 34 may or may not serve as a pivot itself for the lock member 19. It originally has dual function of avoiding any possibility of defective molding due to the provision of the recess 27 for accommodating the spring 30 at some sacrifice of the lock member strength and also for reinforcing the resulting lock member. The bulged portion rests completely in the opening formed in the housing and enables the lock member to meet the size-reduction requirement.

Figure 3:
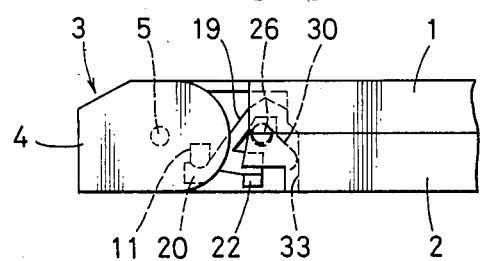
FIG. 3 is a side view of a magnetic tape cassette embodying the invention, specifically showing the front part including the locking mechanism.
Figure 4:
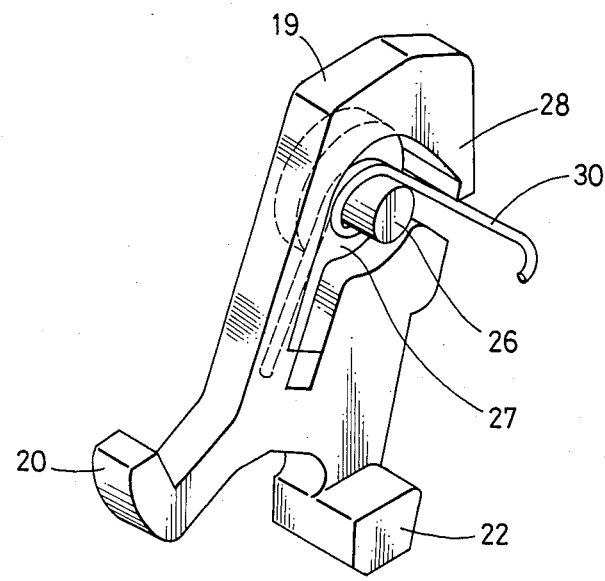
FIG. 4 is a perspective view of the lock member and the spring according to the invention.
Figure 5:
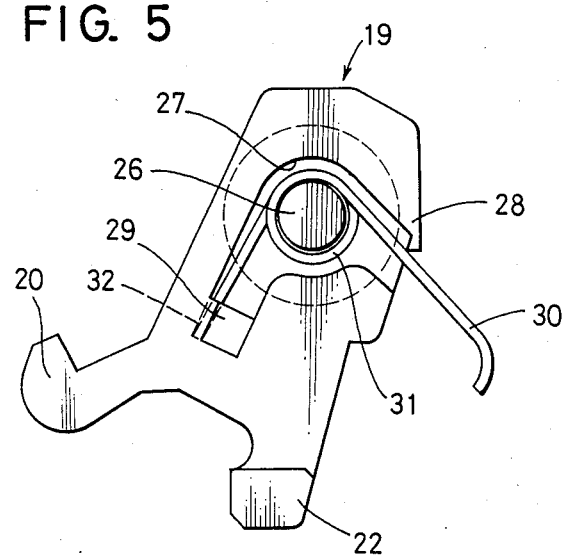
FIG. 5 is a side view of the above components.

The locking mechanism of the construction described above is incorporated in a cassette housing in the following way. First, the coiled center 31 of the spring 30 is fitted over the pivot 26 of the lock member 19, and one end 32 of the spring is inserted into the blind hole 29, and then the free end of the spring is forced downward into engagement with the overhang 28. Thus, the spring 30 in a biased state is held within the recess 27 of the lock member 19. Next, the lock member 19 is forced in between the upright walls 35 and 36 of the lower housing section 2 yet to be lidded, so as to fit the pivot 26 in the bearing hole and the bulge 34 loosely in the opening 37. For the convenience of assembling, the upright wall 35 can be elastically deflected. The free end of the spring 30 is abutted against the vertical surface 33. The upper housing section 1 is mated with the lower one, and finally the lid 3 is attached to complete the assembly as shown in FIG. 3.

According to the invention, as described above, the spring is preloaded in the recess of the lock member in a manner not readily disengageable so that the subassembly can be simply incorporated in between the upper and lower housing sections. Since the spring is accommodated within the thickness of the lock member, the overall dimensions of the locking mechanism are reduced, permitting a corresponding decrease in the size of the tape cassette or provision of an extra space for some other mechanism. The disk-shaped bulge, larger in diameter than the pivot and formed on the side of the lock member opposite to the recessed side for the spring, controls the molding strain and adds strength. Yet it can be loosely accommodated in the corresponding opening in the housing wall, in no way affecting the merit of size reduction of the lock member.

What is claimed is:

1. A magnetic tape cassette comprising:
   a cassette housing having a front opening;
   a lid pivotally connected to the front of the housing to open and close the front opening;
   a lock member having a pivot for pivotally mounting the lock member on one front side portion of the housing and the lock member being lockingly engageable with and disengageable from an inner surface of the lid;
   the lock member having a recess surrounding the pivot with a lateral side opening and a rear side opening, the lateral side opening being parallel to the front side portion of the housing, the rear side opening being opposite the front of the housing; and
   a lock-member-biasing spring accommodated in the recess, a first end of the spring extending rearwardly through the rear side opening of the recess and engaging the housing, the lock-member-biasing spring biasing the member into locking engagement with the inner surface of the lid.

2. The magnetic tape cassette according to claim 1, wherein prior to the insertion of the lock member into the cassette the first end of the spring is retained in the recess by an overhang at the rear side opening of the lock member, and the other end of the spring is retained by a wall of the recess, the wall being located opposite from the overhang.

3. The magnetic tape cassette according to claims 1 or 2, wherein a bulge is formed on the side of the lock member opposite to the side where said recess is formed, and said bulge is larger in diameter than the pivot and accommodated within a wall opening of the cassette housing.

* * * * *